(12) United States Patent
Sun

(10) Patent No.: US 7,081,436 B2
(45) Date of Patent: Jul. 25, 2006

(54) PASTE FORMULATION FOR SEED TREATMENT OF PLANTS

(75) Inventor: Jinxia Sun, Yorktown, NY (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 09/769,388

(22) Filed: Jan. 26, 2001

(65) Prior Publication Data

US 2002/0147111 A1    Oct. 10, 2002

(51) Int. Cl.
*A01N 26/26*    (2006.01)
(52) U.S. Cl. .................................................. 504/100
(58) Field of Classification Search .................. 504/100
See application file for complete search history.

(56) References Cited

U.S. PATENT DOCUMENTS

| | | | |
|---|---|---|---|
| 4,182,716 A | 1/1980 | Znotins et al. ................. | 549/14 |
| 4,319,033 A | 3/1982 | Tsai et al. ...................... | 549/15 |
| 4,440,756 A * | 4/1984 | Herve' et al. ................. | 424/174 |
| 4,497,646 A | 2/1985 | Rubio ............................ | 71/3 |
| 4,569,690 A | 2/1986 | Brouwer et al. ............... | 71/90 |
| 4,656,162 A | 4/1987 | Itoh et al. | |
| 4,753,035 A | 6/1988 | Ryan et al. | |
| 4,839,349 A | 6/1989 | Covey et al. .................. | 514/92 |
| 4,857,649 A | 8/1989 | Lai et al. ...................... | 548/262 |
| 4,927,451 A | 5/1990 | Brouwer et al. ............... | 71/92 |
| 4,943,309 A | 7/1990 | Bell ............................... | 71/74 |
| 4,945,113 A | 7/1990 | Nowakowski et al. ....... | 514/605 |
| 4,950,671 A | 8/1990 | Lai et al. ...................... | 514/277 |
| 4,966,910 A | 10/1990 | Lai et al. ...................... | 514/383 |
| 4,966,912 A | 10/1990 | Relea et al. ................... | 514/397 |
| 4,979,982 A | 12/1990 | Brouwer et al. ............... | 71/92 |
| 4,981,508 A | 1/1991 | Strunk et al. .................. | 71/92 |
| 5,010,068 A | 4/1991 | Dekeyser et al. ............. | 514/79 |
| 5,039,332 A | 8/1991 | Friedlander et al. ........... | 71/92 |
| 5,061,716 A | 10/1991 | Relyea et al. .................. | 514/336 |
| 5,070,211 A | 12/1991 | Dekeyser et al. ............. | 549/378 |
| 5,071,862 A | 12/1991 | Friedlander et al. ......... | 514/336 |
| 5,093,853 A | 3/1992 | Licht et al. .................... | 378/117 |
| 5,108,649 A | 4/1992 | Spicer et al. | |
| 5,114,464 A | 5/1992 | Davis et al. ................... | 71/92 |
| 5,134,133 A | 7/1992 | Covey et al. .................. | 514/92 |
| 5,134,144 A | 7/1992 | Brouwer et al. ............. | 514/274 |
| 5,134,145 A | 7/1992 | Brouwer et al. ............. | 514/274 |
| 5,169,430 A | 12/1992 | Strunk et al. .................. | 71/92 |
| 5,176,735 A | 1/1993 | Bell .............................. | 504/168 |
| 5,215,747 A | 6/1993 | Hairston et al. ............... | 424/93 |
| 5,319,102 A | 6/1994 | Davis et al. ................... | 549/28 |
| 5,328,942 A | 7/1994 | Akhtar et al. ................. | 524/35 |
| 5,558,806 A * | 9/1996 | Policello et al. ............. | 252/355 |
| 5,580,544 A | 12/1996 | Dao et al. | |

FOREIGN PATENT DOCUMENTS

GB    1141798    11/1965

| | | |
|---|---|---|
| GB | 2095115 | 9/1982 |
| RU | 210462 | 2/1998 |

OTHER PUBLICATIONS

Thompson et al, Adjuvant effects on imazethapyr, 2,4-D and picloram absorption by leafy spurge, Weed Science, 1996, vol. 44 No. 3, pp. 469-475.*
McCutcheon's Emulsifiers & Detergents, North American Edition (2000), pp. 289-324.
McCutcheon's Emulsifiers & Detergents, International Edition (2000), pp. 256-278.
Kirk-Othmer Encyclopedia of Chemical Technology ,Third Edition, vol. 7, (1979) pp . 430-448.
Kirk-Othmer Encyclopedia of Chemical Technology ,Third Edition, vol. 20, (1982) pp . 232 and 233.
Peter J.G. Stevens "Organosilicone Surfactants as Adjuvants for Agrochemicals" Pesticide Science, Elsevier Applied Science Publisher. Barking, GB, vol. 38, No. 2/3 (1993) at pp. 103-122.
J. De Tempe, "The Fungicide-Treated Seed In The Soil", *Soil Disinfestation*, Developments in Agricultural and Managed-Forest Ecology, 6. pp. 205-230, 1979.

* cited by examiner

*Primary Examiner*—Alton Pryor

(57)    ABSTRACT

Disclosed herein is a composition comprising a seed treatment formulation and an organosilicone additive of the formula:

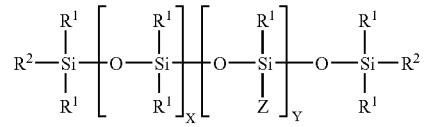

wherein:
X is a number from 0 to 30;
Y is a number from 0 to 10;
each $R^1$ and $R^2$ is independently selected from the group consisting of alkyl moieties of from 1 to 18 carbon atoms, provided that, if Y is 0, at least one $R^2$ is Z;
Z is $R^3OB_nG$;
$R^3$ is an alkylene moiety of from 1 to 4 carbon atoms;
B is an alkylene oxide moiety selected from the group consisting of ethylene oxide, propylene oxide, butylene oxide, and mixtures thereof,
n is a number from 1 to 50 if, and only if, B contains ethylene oxide, otherwise n is a number from 1 to 10; and
G is selected from the group consisting of hydrogen, hydrocarbon moieties of from 1 to 18 carbon atoms, and acetyl.

15 Claims, No Drawings

PASTE FORMULATION FOR SEED TREATMENT OF PLANTS

BACKGROUND OF THE INVENTION

1. Field of the Invention

The present invention is related to additives for formulations used for treating seeds, especially water-dispersible paste formulations. More particularly, the present invention relates to the use of an organosilicone in seed treatment compositions, which enhances the even coating of a pesticide and, where a pigment or dye is present, the color intensity on the seeds.

2. Description of Related Art

Seeds have been treated with a wide variety of enhancement chemicals for decades. These treatments serve to differentiate seed, increase the storage life and viability of the seed, and protect them against disease, pests, and the like. See, for example, De Tempe, J., *The Fungicide-Treated Seed in the Soil*, Chapter 10, pp. 205–230 (Dev. Agric. Managed-For. Ecol.=, 1979, 6) and Maude, R. B. *Pestic. Outlook* 1(4):16–22 (1990).

Seed coating is a process of applying finely ground solids or liquids containing dissolved or suspended solids to form a more or less continuous layer covering the natural seed coat. Compositions and formulations used for treating seeds and for foliar treatment of plants are well known. In this regard, U.S. Pat. No. 5,328,942 as well as United Kingdom Patent Application GB 2 095 115 A are illustrative.

To reduce costs, many seed-treatment formulators would prefer to be able to use paste formulations instead of conventional, commercially-available liquid formulations, wherein such use of paste formulations results in significant cost savings. The utilization of a paste formulation tends to result in lesser included amounts of water, but a paste formulation tends to disperse slowly. Yet, it is highly desirable that formulations for treatment of seeds as well as formulations for foliar treatment of plants readily and quickly disperse, preferably uniformly, when combined with water. Those skilled in the relevant art know, however, that conventional non-aqueous paste formulations are generally not capable of readily and quickly dispersing. Furthermore, and as those in the relevant art also know full well, the selection of a dispersant or dispersing agent for inclusion in a paste formulation for treatment of seeds or for foliar treatment of plants must be done carefully for several reasons. For example, while a dispersant, in general, may typically be selected for purposes of providing a certain formulation with a number of desired physical properties, some of which are mentioned herein, the presence of a dispersant or dispersing agent in the paste formulation—because of the surface-charge nature of the dispersant or dispersing agent—may undesirably affect the ability of the formulation to adhere to (i.e. "stick to") a particular seed or plant leaf; and, if the formulation further includes a dye or coloring agent, may undesirably affect the ability of the formulation to uniformly color the seed or leaf that is to be treated.

However, coloring treated seeds is required by law to avoid misconsumption. Currently, both dyes and pigments are used for seed coloring. Owing to the problem of cleaning off the color from equipment, seed treatment manufacturers and growers prefer using pigments to dyes. Basically, the seed treatment formulation should provide uniform coverage, adequate surface adhesion, and biological efficacy. Both pigments and dyes require even coverage and deposition of the formulation and, additionally, the pigments are very expensive. To the extent that additives can be provided that will help in uniformly depositing the formulation and coloring the seed, they will have market value.

It would therefore be desirable to have commercially-available a flowable concentrate formulation that is not only able to disperse readily and quickly, but is also able to adhere strongly to, and uniformly coat, a treated seed. The attendant possibility of a reduction in the amount of pigment needed in the formulation is an added benefit. Put simply, seed-treatment formulators would mandate a uniform coating of "actives" and coloring agent on their seed, wherein the seed-treatment coating neither "dusts" (i.e. neither causes formation of dust or other particles) nor rubs off their seed, neither of which is desirable.

U.S. Pat. No. 4,753,035 discloses the use of crosslinkable silicone materials to coat botanic seeds, seedlings, meristematic tissue and plant embryos for their protection and to promote germination. The crosslinkable silicone materials are coated onto the seeds, seedlings, meristematic tissues or plant embryos and crosslinked to cure them. It is said that the silicone coatings provide antifungal protection, can be used to carry entrapped plant adjuvants to the site of germination, are permeable to water vapor and oxygen, and allow sunlight to pass through to the germinating seed.

U.S. Pat. No. 5,106,649 discloses a method for improving the bulk flow properties of pesticide-treated plant seeds. The seeds are treated with low levels of a polydimethylsiloxane lubricant which is applied either to seeds that have already been treated with a pesticidal substance or to seeds simultaneously with a pesticidal substance. The polydimethylsiloxane lubricant can be applied either by coapplication from separate compositions or by the application of a composition containing both the pesticidal substance and the polydimethylsiloxane lubricant.

U.S. Pat. No. 5,580,544 discloses water-dispersible paste formulations that are used in connection with seed treatment and foliar treatment of plants to provide excellent dust and rub-off control. The paste formulations comprise an active ingredient and a hydrocarbon oil carrier having a boiling point of at least 150° C. The carrier is present in an amount that is effective for reducing dusting off of the plant leaf or seed. The paste formulations further include a surfactant and an effervescent comprising an alkaline carbonate and a solid and weak acid. The surfactant, the alkaline carbonate, and the solid and weak acid are respectively present in an amount that is effective for enabling the paste formulation to readily and quickly be dispersed in water. The paste formulations are especially suitable for containment in water soluble and/or water-dispersible bags or pouches, such use tending to render the active ingredient safer to handle and therefore better for consumers and the environment.

U.K. Patent No. 1,141,796 discloses a method for modifying the rate of germination of the seed of a plant which comprises applying to the outer surface of the seed a coating of an organosilicon compound or mixture of organosilicon compounds selected from organohalosilanes, organopolysiloxanes and mixtures of defined distillable by-produced organosilicon compounds.

The disclosures of the foregoing are incorporated herein by reference in their entirety.

The foregoing desiderata, as well as other features and advantages of our present invention will become more readily apparent to those skilled in the relevant art upon reading the following summary and detailed description of our present invention.

SUMMARY OF THE INVENTION

As stated above, the present invention relates to the use of an organosilicone in seed treatment formulations. These dispersible paste formulations have been found to provide excellent uniform seed coating and improved color intensity of pigmented coatings.

More particularly, the present invention is directed to a composition comprising a seed treatment formulation and an organosilicone additive of the formula:

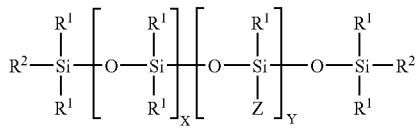

wherein:

X is a number from 0 to 30, preferably 0 to 5;

Y is a number from 0 to 10, preferably 1 to 5;

each $R^1$ and $R^2$ is independently selected from the group consisting of alkyl moieties of from 1 to 18 carbon atoms, provided that, if Y is 0, at least one $R^2$ is Z;

Z is $R^3OB_nG$;

$R^3$ is an alkylene moiety of from 1 to 4 carbon atoms;

B is an alkylene oxide moiety selected from the group consisting of ethylene oxide, propylene oxide, butylene oxide, and mixtures thereof;

n is a number from 1 to 50 if, and only if, B contains ethylene oxide, otherwise n is a number from 1 to 10; and G is selected from the group consisting of hydrogen, hydrocarbon moieties of from 1 to 18 carbon atoms, and acetyl.

DESCRIPTION OF THE PREFERRED EMBODIMENTS

As described above, the present invention is directed to a composition comprising a seed treatment formulation and an organosilicone additive of the formula:

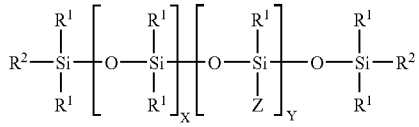

wherein:

X is a number from 0 to 30, preferably 0 to 5;

Y is a number from 0 to 10, preferably 1 to 5;

each $R^1$ and $R^2$ is independently selected from the group consisting of alkyl moieties of from 1 to 18 carbon atoms, provided that, if Y is 0, at least one $R^2$ is Z;

Z is $R3OB_nG$, $R^3$ is an alkylene moiety of from 1 to 4 carbon atoms, preferably 2 or 3 carbon atoms, more preferably 3 carbon atoms;

B is an alkylene oxide moiety selected from the group consisting of ethylene oxide, propylene oxide, butylene oxide, and mixtures thereof;

n is a number from 1 to 50 if, and only if, B contains ethylene oxide, otherwise n is a number from 1 to 10; and G is selected from the group consisting of hydrogen, hydrocarbon moieties of from 1 to 18 carbon atoms, and acetyl.

Where G is a hydrocarbon moiety of from 1 to 18 carbon atoms, it can be alkyl, aryl, aralkyl, alkaryl, or cycloalkyl. Preferably, G is hydrogen or alkyl, more preferably, hydrogen or alkyl of from 1 to 8 carbon atoms, most preferably hydrogen or alkyl of from 1 to 4 carbon atoms.

As employed herein, the term "alkyl moiety of from 1 to 18 carbon atoms" is intended to include methyl, ethyl, propyl, butyl, pentyl, hexyl, heptyl, octyl, nonyl, decyl, undecyl, dodecyl, tridecyl, tetradecyl, pentadecyl, hexadecyl, deptadecyl, octadecyl, and isomers of the foregoing, such as, t-butyl, 2-ethylhexyl, and the like. It is preferred that all the $R^1$ groups, and all $R^2$ groups as well where $R^2$ does not equal Z, be the same alkyl group. It is more preferred that they all be methyl.

$R^3$ is a bridging alkylene group of from 1 to 4 carbon atoms, such as, methylene, ethylene, propylene, butylene, and isomers thereof; preferably $R^3$ is ethylene or propylene, i.e., —$CH_2CH_2$— or —$CH_2CH_2CH_2$—, more preferably propylene.

B can be ethylene oxide, propylene oxide, butylene oxide, including all isomers, or mixtures of the foregoing; preferably B is ethylene oxide and/or propylene oxide, more preferably ethylene oxide.

If B contains ethylene oxide, n can be any number from 1 to 50; where no ethylene oxide is present in B, n is any number from 1 to 10.

The seed treatment formulation employed in the practice of the present invention preferably includes at least one of the following: an active ingredient, a sticker/carrier, a surfactant, a dispersant, an anti-caking agent, a foam-control agent, or a pigment or dye. Additional optional components can also be included. It is especially preferred that the formulation includes at least one pigment or dye.

In order to clearly describe the present invention, certain terms will be utilized for purposes of conciseness and otherwise to elucidate its various aspects, features, and advantages. These terms are defined hereinbelow.

The term "paste" shall be understood to mean a finely-divided resinous composition, which typically includes a plasticizer-like ingredient to form a fluid or semifluid mixture, wherein the paste is made without use of low boiling solvents or water emulsions.

The term "active" as used herein shall, in general, be understood to mean any ingredient that is chemically active and/or biologically active in origin. In this regard an "active" ingredient can be a single ingredient or a combination of ingredients; and the meaning of the term "active" shall be understood to include but not be limited to the following:

(1) such arthropodicidally-active compositions-of-matter as are disclosed and listed in U.S. Pat. No. 5,093,853;

(2) such bactericidally-active compositions-of-matter as are disclosed in U.S. Pat. No. 4,182,716;

(3) such fungicidally-active compositions-of-matter as are disclosed in U.S. Pat. No. 4,182,716; U.S. Pat. No. 4,497,646; U.S. Pat. No. 4,569,690; U.S. Pat. Nos. 4,857,649 and 4,950,671; U.S. Patent Nos. 4,966,912 and 5,061,716; U.S. Pat. Nos. 5,039,332 and 5,071,862; and U.S. Pat. No. 5,215,747;

(4) such herbicidally-active compositions-of-matter as those disclosed in U.S. Pat. No. 4,497,646; U.S. Pat. Nos. 4,569,690 and 4,927,451; U.S. Pat. No. 4,945,113; U.S. Pat. No. 4,966,910; U.S. Pat. No. 4,979,982 (to Brouwer et al.; U.S. Pat. No. 4,981,508; U.S. Pat. No. 5,114,464; U.S. Pat. No. 5,169,430; and U.S. Pat. No. 5,319,102;

(5) such microbiologically-active compositions-of-matter as are disclosed in U.S. Pat. No. 5,215,747;

(6) such pesticidally-active compositions-of-matter as those disclosed in U.S. Pat. No. 4,839,349; U.S. Pat. No. 5,010,068; U.S. Pat. No. 5,134,133; and U.S. Pat. Nos. 5,134,144 and 5,134,145; and (7) such plant growth regulant-active compositions-of-matter as those disclosed in U.S. Pat. No. 4,319,033; U.S. Pat. No. 4,857,649; U.S. Pat. No. 4,943,309; U.S. Pat. No. 5,039,332; U.S. Pat. No. 5,070,211; and U.S. Pat. No. 5,176,735.

Among the active ingredients that are suitable for use in the practice of the present invention may be listed 5,6-dihydro-2-methyl-1,4-oxathiine-3-carboxanilide 4,4-dioxide, also known as oxycarboxin (common name) as well as by its trademark PLANTVAX®; 2,3-dihydro-2,2-dimethyl-7-benzofuranyl methyl carbamate, also known as carbofuran (its common name); methylcarbamic acid 2-(2-chloro-1-methoxy ethoxy)phenyl ester, also known as cloethocarb (its common name); 2-(4-chlorophenyl)-3-cyclopropyl-1-(1H-1,2,4-triazol-1-yl)-butan-2-ol, also known as cyprocnazole (its common name); pentachloronitrobenzene, also known as cyproconazole (its common name); pentachloronitrobenzene, also known as quintozene (common name) as well as by its trademark TERRACLOR®; 5-ethoxy-3-(trichloromethyl)-1,2,4-thiadiazole, also known as etridiazole (common name) as well as its trademark TERRAZOLE®; *Rhizobium* sp; *Penicillium bilajii*; *Bacillus subtilis*; β-(4-chlorophenoxy)-α-(1,1-dimethylethyl)-1H-1,2,4-triazole-1-ethanol, also known as triadimenol (common name) or by its trademark BAYTAN®; tetramethylthiuram disulfide, also known as thiram (common name); 2-(4-thiazolyl)benzimidazole, also known as thiabendazole (common name) as well as its abbreviation "TBZ"; (2-methyl[1,1'-biphenyl]-3-yl)methyl-3-(2-chloro-3,3,3trifluoro-1-propenyl)-2,2-dimethylcyclopropane-carboxylate, also known as bifenthrin (common name); 1,2,3,4,5,6-hexachlorocyclo-hexane, gamma-isomer, also known as lindane (common name); N-(2,6-dimethylphenyl)-N-(methoxyacetyl)alanine methyl ester, also known as metalaxyl (common name); 1-[(6-chloro-3-pyridinyl)methyl]-N-nitro-2-imidazolidinimine, also known as imidacloprid (common name); and α-butyl-α'-(4-chlorophenyl)-1H-1,2,4-triazole propanenitrile, also known as myclobutanil (common name).

Preferred active ingredients are selected from the group consisting of triadimenol; imidacloprid; lindane; oxycarboxin; tebuconazole; thiabendazole; thiram; carboxin; and mixtures thereof.

Other "active" ingredients useful in conjunction with the present invention are cited and otherwise set forth in the examples of this patent specification.

The term "sticker" as used herein shall in general be understood to mean an "adherent" or "adhesion agent," the terms "adherent" and "adhesion agent" connoting ingredients capable of causing a substance to adhere to a substrate. In this regard, the "sticker" functions as a carrier. A preferred "sticker" agent is a hydrocarbon oil having a boiling point of at least 150° C., wherein the "sticker" agent functions as a carrier and is present in an amount that is effective for reducing dusting off of the plant seed. Preferred hydrocarbon oil carriers are selected from the group consisting of vegetable oil (such as canola oil), petroleum-based hydrocarbon oil, paraffinic/naphthenic hydrocarbon oil, mineral oil, and mixtures thereof.

The term "surfactant"—which includes the terms "emulsifier" and "detergent"—as used herein means a composition of matter that either alters surface tension when dissolved in water or an aqueous solution or alters interfacial tension between immiscible liquids or a liquid and a solid. Surfactants suitable for purposes of the present invention are listed in McCutcheon's Emulsifiers & Detergents, at pages 287–310 of the North American Edition (1994), and in McCutcheon's Emulsifiers & Detergents, at pages 257–278 and 280 of the International Edition (1994), both published by MC Publishing Co. (McCutcheon Division) of Glen Rock, N.J. In this regard, suitable surfactants include, but are not limited to, alkylaryl sulfonates, block polymers, carboxylated alcohol or alkylphenol ethoxylates, ethoxylated alcohols, ethoxylated alkylphenols, glycol esters, lignin and lignin derivatives, polyethylene glycols, silicone-based surfactants, sulfates and sulfonates ethoxylated alkylphenols, sulfonates of condensed naphthalenes, sulfonates of dodecyl and tridecylbenzenes, sulfonates of naphthalene and alkyl naphthalene, sulfosuccinamates, and sulfosuccinates and sulfosuccinate derivatives.

Preferred surfactants are selected from the group consisting of alkaryl sulfonates, diphenyl sulfonate derivatives, lignin and lignin derivatives, silicone-based surfactants, sulfonates of condensed naphthalenes, sulfonates of dodecyl/tridecyl benzene, sulfonates of naphthalene and alkyl naphthalene, sulfosuccinamates, sulfosuccinates, and mixtures thereof.

The term "dispersant" or "dispersing agent" as used herein connotes a surface-active agent that is added to suspending media to promote uniform suspension or separation of typically extremely fine solid particles, often of colloidal size. Dispersants suitable for purposes of the present invention are listed in McCutcheon's Functional Materials, at pages 122–142 of the North American Edition (1994), as well as in McCutcheon's Functional Materials, at pages 47–56 of the International Edition (1994), both published by MC Publishing Company (McCutcheon Division) of Glen Rock, N.J. In this regard, suitable dispersants include, but are not limited to, nonionic block copolymers, 46% tetramethyl decynediol on amorphous silica, anionic lignin surfactant formulations (including sodium salts of modified sulfonated lignin; and sodium salts of highly sulfonated lignin), polyvinyl pyrrolidone, sodium butyl naphthalene sulfonate (including diisobutyl sodium sulfosuccinate), dihexyl sodium sulfosuccinate, dioctyl ester of sodium sulfosuccinic acid (including dioctyl sodium sulfosuccinate), ditridecyl sodium sulfosuccinate, sodium dicyclohexyl sulfosuccinate, sodium dodecylbenzene sulfonate, polycarboxylate, sodium salt of polymeric carboxylic acid, polycarboxylate copolymers (including sodium salts of polymers made from the copolymerization of acrylic acid and maleic acid), polyacrylates (including anionic polyacrylate polymer such as polyacrylic acids and sodium polyacrylate), ammonium salt of polyacrylic acid, sodium alkyl naphthalene sulfonates (including sodium di-n-butyl naphthalene sulfonate and sodium di-isopropyl naphthalene sulfonate), lignosulfonates (including nonionic surfactant and sodium lignosulfonate blend; and anionic surfactant and sodium lignosulfonate blend), modified lignosulfonates, sodium and calcium lignosulfonates (including modified calcium lignosulfonate; modified sodium lignosulfonate; modified sodium-calcium lignosulfonate; highly purified calcium lignosulfonate; highly purified sodium lignosulfonate; highly purified partially desulfonated sodium lignosulfonate; sugar-free calcium and sugar-free sodium lignosulfonate; alkaline sugar-free sodium lignosulfonate; and the sodium salt of highly sulfonated kraft pine lignosulfonate), ammonium lignosulfonate, sugar-free ammonium lignosulfonate, sodium polynaphthalene sulfonate, sodium naphthalene sulfonic acid formaldehyde, sodium and calcium salts of polymerized substituted benzoid alkyl sulfonic acids, sodium neutralized condensed naphthalene sulfonic acids (including sodium salts of condensed naphthalene sulfonic acid and sodium salts of a condensed mononaphthalene sulfonic acid), ammonium salts of a condensed mononaphthalene sulfonic acid, sodium salts of polymerized alkyl naphthalene sulfonic acids, potassium salts of polymerized alkyl naphthalene sulfonic acids, calcium salts of polymerized alkyl substituted benzoid alkyl sulfonic acids, sodium salts of polymerized alkyl and substituted benzoid alkyl sulfonic acids, sodium salts of carboxylated polyelectrolytes, sulfonates of condensed naphthalenes, and neutralized sulfonates of naphthalene/formaldehyde condensates (including sodium sulfonates of naphthalene formaldehyde condensate and sodium salts of a sulfonated naphthalene formaldehyde condensate).

Preferred dispersants are selected from the group consisting of block polymers, alkylphenol ethoxylates, ethoxylated alcohols, ethoxylated alkylphenols, polyacrylic acid, propoxylated alkylphenols, sulfonated ethoxylated alkylphenols, lignin and lignin derivatives, tridecyl and dodecyl benzene sulfonic acid, and mixtures thereof.

The term "anti-caking agent" shall, in general, be understood to mean a substance used to improve the integrity of a paste and to lessen the likelihood of settling of a suspension. The term "anti-caking agent" shall, more particularly, be understood to mean a substance that promotes overall structure, body, or suspension properties, or that provides a rheological modification to the final desired product. Among the anti-caking agents that are suitable in the practice of the present invention may be listed: fumed silica (untreated or treated) synthetic calcium silicate, sodium polyalkyl naphthalene sulfonate, microcrystalline cellulose, sodium aluminosilicate, and the like.

The term "pigment," which includes the term "dye," as used herein means a composition of matter, usually in the form of a dry powder, that imparts color to another composition of matter or to a mixture. The term "dye" as used herein connotes an organic colorant, derived from a petroleum-based intermediate, to impart permanent color to a substrate.

The term "foam-control" agent or ingredient shall be understood to mean a substance that is used to reduce foaming. Foaming may result from the presence of such foam-inducing agents as proteins, gases, or nitrogenous materials. The presence of foam is generally undesirable because foam may interfere with processing. Foam-control agents are generally discussed at pages 430–447 in the Kirk-Othmer Encyclopedia of Chemical Technology, third edition, volume 7, published 1979 by John Wiley & Sons, Inc. Examples of conventional "foam-control" agents include but are not limited to the group consisting of certain organic phosphates, certain silicone fluids, certain sulfonated oils, and 2-octanol.

Additional foam-control agents suitable for purposes of the present invention include but are not limited to silicone-based powder (available from Calgene Chemical Inc. of Skokie, Ill.); mineral oil adsorbed onto silica substrate (available from Rhone Poulenc Corp. of Cranbury, N.J.); tallow soap; synthetic oil adsorbed onto hydrophilic silica (available from Ross Chemical of Fountain Inn, S.C.); silica-based powders; silicone defoamer; and various mixtures of silicone, silica, and polyethylene glycol 600 dioleate.

A preferred seed treatment formulation comprises at least one active ingredient, at least one carrier, at least one surfactant, at least one dispersing agent, at least one pigment or dye, and at least one anti-caking agent, although one or more of these ingredients can be omitted, if desired. More preferably, the seed treatment formulation comprises from about 0.1% to about 80% by weight of at least one active ingredient, about 10% to about 50% by weight of a carrier, about 0.1% to about 20% by weight of at least one surfactant, about 0.1% to about 30% by weight of at least one dispersing agent, at least one pigment or dye, and at least one anti-caking agent.

Various features and aspects of the present invention are illustrated further in the examples that follow. While these examples are presented to show one skilled in the art how to operate within the scope of the invention, they are not intended in any way to serve as a limitation upon the scope of the invention.

EXAMPLES

Flowable Concentrate Preparation

The preparation of flowable concentrates containing the silicone additive is accomplished by adding the silicone either to a ready-made flowable concentrate, or to a mixture of flowable concentrate and pigment or dye with proper mixing or blending.

Typical ingredients that can be used in the preparation of the flowable concentrates have been described above.

When the organosilicone is incorporated into the seed treatment formulation to form the compositions of the present invention, the formulation is prepared by mixing or blending the ingredients together. The order of addition for the organosilicone is not important.

Flowable Concentrate Application to Seed Treatment

Flowable concentrate can be applied as a film-coating or seed dressing. With particle suspensions, flowable concentrates provide better adhesive properties. Liquid formulations can be purchased and used without the need for dilution. The water-soluble properties permit easy cleaning of the machinery after use.

The amount of organosilicone in the total flowable concentrate ranges from about 0.01 to 20%, and preferably the amount ranges from about 1 to 2% by weight.

Description of Test Methods

Ten grams of tested seed was placed in a 120 ml wide mouth jar and 0.1 g of flowable concentrate was added. The jar was capped and was mechanically agitated for 30 seconds using a Mini Vortexer (VWR Scientific Products) at 2000 RPM. The seeds were transferred to a 20 ml transparent vial. The color intensity and coverage were visually assessed under both normal and UV light.

Example 1

Description of Organosilicone Components in the Invention

The organosilicone structure used in this example is of the following structure and the detail there is provided in Table 1.

TABLE 1

Organosilicones Included in the Listed Ec Formulations

| Reference | X | Y | Description of Z group |
|---|---|---|---|
| Silicone 1 | 0 | 1 | $C_3H_6O(C_2H_4O)_{7.5}$—H |
| Silicone A | 7 | 3 | $C_3H_6O(C_3H_6O)_{13}$—Bu |
| Silicone B | 75 | 5 | $C_3H_6O(C_2H_4O)_{20}(C_3H_6O)_{23}$—$CH_3$ |
| Silicone 2 | 15 | 5 | $C_3H_6O(C_2H_4O)_{12}$—H |
| Silicone 3 | 0 | 1.9 | $C_3H_6O(C_2H_4O)_{7.5}$—$CH_3$ |

In the above, Silicones 1, 2, and 3 are exemplary of the compositions of the present invention. Silicones A and B are comparative examples and are outside the scope of the present invention.

Example 2

Vitax flowable suspension concentrate formulations (commercially available from Uniroyal Chemical Co.) with or without organosilicones have been used to treat soybean seeds as described in the section on test methods. The following table shows the composition of the seed treatment formulation.

Formulation for Soybean Seed Treatment

| Formulation | Vitax[a] % | Pigment[b] % | Silicone % |
|---|---|---|---|
| SC/Silicone 1[d] | 94.9 | 5 | 0.1 |
| SC/Silicone A[d] | 94.9 | 5 | 0.1 |
| SC/Silicone B[d] | 94.9 | 5 | 0.1 |
| SC/Silicone 2[d] | 94.9 | 5 | 0.1 |
| SC/Silicone 3[d] | 94.9 | 5 | 0.1 |
| SC[c] | 95 | 5 | 0 |

[a]Vitax: A flowable seed treatment formulation from Uniroyal Chemical Co.
[b]Rocket Red pigment from Day-Glo Color Corp., 4515 St., Clair Avenue, Cleveland, OH 44103.
[c]Flowable suspension concentrate containing pigments only.
[d]Flowable suspension concentrate containing both pigments and organosilicone.

Results:

1. Different Formulation Effect on the Color Intensity of the Coated Soybean Seeds The color intensity of soybean seeds coated with Silicone 3 gave a more intensive color relative to the other treatments. The color intensity of soybean seeds coated with the several formulations is in the following order:

SC/Silicone 3>SC/Silicone 2>SC > SC/Silicone 1=SC/Silicone A>SC/Silicone B

2. Different Formulation Effects on the Covering of the Coated Seeds

Compared to SC, the seeds coated with SC/Silicone 3 have a more uniform covering with the formulation, with much less exposed area when observed under both normal and UV light.

Example 3

Vitax flowable suspension concentrate formulations (Uniroyal Chemical Co.) containing varying amounts of pigment have been used to treat soybean seeds as described in the sections on test methods. The following table shows the composition of the seed treatment formulation.

Flowable Suspension Concentrate Formulation

| Formulation | Vitax[a] % | Pigment[b] % | Silicone % |
|---|---|---|---|
| SC 5%[c] | 95.0 | 5 | 0 |
| SC 6%[c] | 94.0 | 6 | 0 |
| SC 8%[c] | 92.0 | 8 | 0 |
| SC 10%[c] | 90.0 | 10 | 0 |
| SC/Silicone 3[d] | 94.9 | 5 | 0.1 |

[a]Vitax: A Flowable Seed treatment formulation from Uniroyal Chemical Co.
[b]Rocket Red pigment from Day-Glo Color Corp., 4515 St., Clair Avenue, Cleveland, OH 44103.
[c]Flowable suspension concentrate containing 5%, 6%, 8% or 10% pigments only.
[d]Flowable suspension concentrate contains 5% pigments and 0.1% organosilicone.

Result:

The color intensity of soybean seeds coated with SC/Silicone 3 is equal to or better than the seed coated with SC 6%.

Example 4

Vitax flowable suspension concentrate formulations (Uniroyal Chemical Co.) with or without organosilicones have been used to treat corn seeds as described in the sections on test methods. The following table shows the composition of the seed treatment formulation.

Formulation for Corn Seed Treatment

| Formulation | Vitax[a] % | Pigment[b] % | Silicone % |
|---|---|---|---|
| SC/Silicone 1[c] | 94.9 | 5 | 0.1 |
| SC/Silicone A[c] | 94.9 | 5 | 0.1 |
| SC/Silicone B[c] | 94.9 | 5 | 0.1 |
| SC/Silicone 2[c] | 94.9 | 5 | 0.1 |
| SC/Silicone 3[c] | 94.9 | 5 | 0.1 |
| SC[d] | 95 | 5 | 0 |

[a]Vitax: A Flowable Seed treatment formulation from Uniroyal Chemical Co.
[b]Waxoline Blue pigment from United Color Technology, Inc., P.O. Box F., Newtown, PA 18940
[c]Flowable suspension concentrate containing pigments only.
[d]Flowable suspension concentrate containing both pigments and organosilicone.

Results:

The color intensity of corn seeds coated at the different formulations is in the following order:

SC/Silicone 3>SC/Silicone 2>SC>SC/Silicone 1=SC/Silicone A>SC/Silicone B

Compared to SC, the seeds coated with SC/Silicone 3 have a more uniform covering with the formulation, with much less exposed area under both normal and UV light.

What has been described herein is a water-dispersible paste formulation that is useful for seed treatment of plants. While the invention has been described with reference to a number of preferred embodiments, it is to be understood that the scope of the invention is not to be limited to these preferred embodiments. On the contrary, alternatives, changes and/or modifications will readily become apparent to those skilled in the art upon a reading of the foregoing detailed description. For example, combinations of more than one active ingredient—e.g. fungicide, insecticide, plant growth regulatory agent, and/or biological agent—may be

What is claimed is:

1. A method for treating seeds comprising applying to said seeds a composition comprising a seed treatment for formulation comprising from about 0.1% to about 80% by weight of at least one active ingredient, about 10% to about 50% by weight of a carrier, about 0.1% to about 20% by weight of at least one surfactant, about 0.1% to about 30% by weight of at least one dispersing agent, at least one pigment or dye, at least one anti-caking agent, and an organosilicone additive of the formula:

$$H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_X-\left[\underset{\underset{Z}{|}}{\overset{\overset{CH_3}{|}}{Si}}-O\right]_Y-\underset{\underset{CH_3}{|}}{\overset{\overset{CH_3}{|}}{Si}}-CH_3$$

wherein:
Z is $C_3H_6O(C_2H_4O)_nG$;
X is a number from 0 to 30;
Y is a number from 1 to 10;
n is a number from 1 to 50; and
G is hydrogen or an alkyl group of from 1 to 4 carbon atoms.

2. A method for treating seeds comprising applying to said seeds a composition comprising a seed treatment formulation comprising at least one pigment or dye and an organosilicone additive of the formula:

$$R^2-\underset{\underset{R^1}{|}}{\overset{\overset{R^1}{|}}{Si}}-O-\left[\underset{\underset{R^1}{|}}{\overset{\overset{R^1}{|}}{Si}}-O\right]_X-\left[\underset{\underset{Z}{|}}{\overset{\overset{R^1}{|}}{Si}}-O\right]_Y-\underset{\underset{R^1}{|}}{\overset{\overset{R^1}{|}}{Si}}-R^2$$

wherein:
X is a number from 0 to 30;
Y is a number from 0 to 10;
each $R^1$ and $R^2$ is independently selected from the group consisting of alkyl moieties of from 1 to 18 carbon atoms; provided that, if Y is 0, at least one $R^2$ is Z;
Z is $R^3OB_nG$;
$R^3$ is an alkylene moiety of from 1 to 4 carbon atoms;
B is an alkylene oxide moiety selected firm the group consisting of ethylene oxide, propylene oxide, butylene oxide, and mixtures thereof;
n is a number from 1 to 50 if, and only if, B contains ethylene oxide, otherwise n is a number from 1 to 10; and
G is selected from the group consisting of hydrogen, hydrocarbon moieties of from 1 to 18 carbon atoms, and acetyl.

3. The method of claim 2 wherein the formulation is a water-dispersible paste.

4. The method of claim 2 wherein all $R^1$ moieties are the same alkyl group.

5. The method of claim 4 wherein at least one $R^2$ group is the same as $R^1$.

6. The method of claim 4 wherein all $R^1$ moieties are methyl groups.

7. The method of claim 2 wherein $R^3$ is propylene.

8. The method of claim 2 wherein B is ethylene oxide.

9. The method of claim 7 wherein B is ethylene oxide.

10. The method of claim 2 wherein the silicone additive is of the formula:

$$H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_X-\left[\underset{\underset{Z}{|}}{\overset{\overset{CH_3}{|}}{Si}}-O\right]_Y-\underset{\underset{CH_3}{|}}{\overset{\overset{CH_3}{|}}{Si}}-CH_3$$

wherein Z is $C_3H_6O(C_2H_4O)_nG$, G is hydrogen or an alkyl group of from 1 to 4 carbon atoms, and Y does not equal zero.

11. The method of claim 2 wherein the seed treatment formulation further comprises at least one ingredient selected from the group consisting of an active agent, a carrier, a surfactant, a dispersing agent, an anti-caking agent, and a foam-control agent.

12. The method of claim 11 wherein the active agent is selected from the group consisting of 5,6-dihydro-2-methyl-1,4-oxathiine-3-carboxanilide 4,4-dioxide; carboxin; 2,3-dihydro-2,2-dimethyl-7-benzofuranyl methyl carbamate; methylcarbamic acid 2-(2-chloro-1-methoxy ethoxy)phenyl ester; 2-(4-chlorophenyl)-3-cyclopropyl-1-(1H-1,2,4-triazol-1-yl)-butan-2-ol; pentachloronitrobenzene; 5-ethoxy-3-(trichloromethyl)-1,2,4-thiadiazole; *Rhizobium* sp; *Penicillium bilajii*; *Bacillus subtilis*; β-(4-chlorophenoxy)-α-(1,1-dimethylethyl)-1H-1,2,4-triazole-1-ethanol; tetramethylthiuram disulfide; 2-(4-thiazolyl)benzimidazole; (2-methyl[1,1'-biphenyl]-3-yl)methyl-3-(2-chloro-3,3,3-trifluoro-1-propenyl)-2,2-dimethylcyclopropane-carboxylate; 1,2,3,4,5,6-hexachlorocyclo-hexane, gamma-isomer; N-(2,6-dimethylphenyl)-N-(methoxyacetyl)alanine methyl ester; 1-[(6-chloro-3-pyridinyl)methyl]-N-nitro-2-imidazolidinimine; tebuconazole; and α-butyl-α'-(4-chlorophenyl)-1H-1,2,4-triazole propanenitrile.

13. The method of claim 11 wherein the carrier is a hydrocarbon oil carrier selected from the group consisting of vegetable oil, petroleum-based hydrocarbon oil, paraffinic/naphthenic hydrocarbon oil, mineral oil, and mixtures thereof.

14. The method of claim 11 wherein the surfactant is selected from the group consisting of alkaryl sulfonates, lignin and lignin derivatives, silicone-based surfactants, sulfonates of condensed naphthalenes, sulfonates of dodecyl/tridecyl benzene, sulfonates of naphthalene and alkyl naphthalene, sulfosuccinamates, sulfosuccinates, and mixtures thereof.

15. The method of claim 11 wherein the dispersing agent is selected from the group consisting of block polymers, alkylphenol ethoxylates, ethoxylated alcohols, ethoxylated alkylphenols, polyacrylic acid, propoxylated alkylphenols, sulfonated ethoxylated alkylphenols, lignin and lignin derivatives, tridecyl and dodecyl benzene sulfonic acid, and mixtures thereof.

* * * * *